April 25, 1939.  J. A. JUMONVILLE  2,156,182
SHADE BRACKET
Filed Oct. 4, 1938   2 Sheets-Sheet 1

Inventor
J. A. Jumonville

By Clarence A. O'Brien
and Hyman Berman
Attorneys

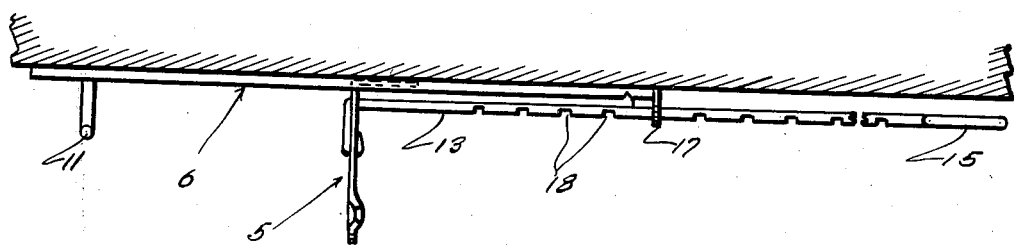
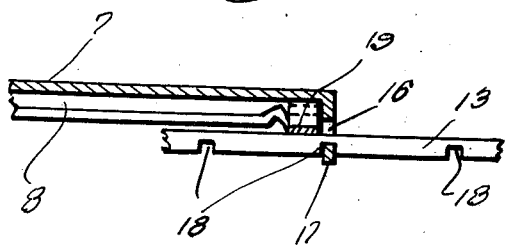
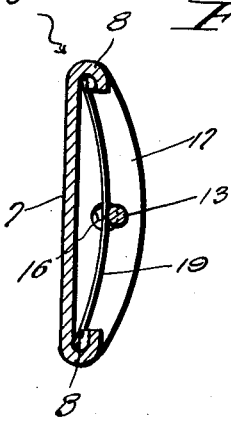
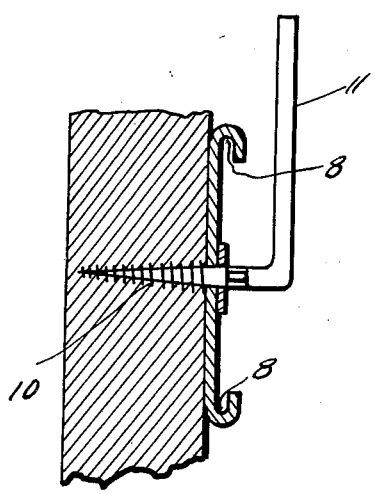
Inventor
J. A. Jumonville

Patented Apr. 25, 1939

2,156,182

UNITED STATES PATENT OFFICE 2,156,182

SHADE BRACKET

Joseph A. Jumonville, New Orleans, La.

Application October 4, 1938, Serial No. 233,291

2 Claims. (Cl. 248—272)

This invention relates to shade brackets and in accordance with the present invention a mounting for the bracket is provided, and said mounting and bracket are equipped with coacting means whereby the bracket may be slid to a desired position of adjustment on the mounting therefor and held at the desired position of adjustment.

The invention together with its objects and advantages will be best understood from a study of the following description taken in connection with the accompanying drawings wherein.

Figure 2:
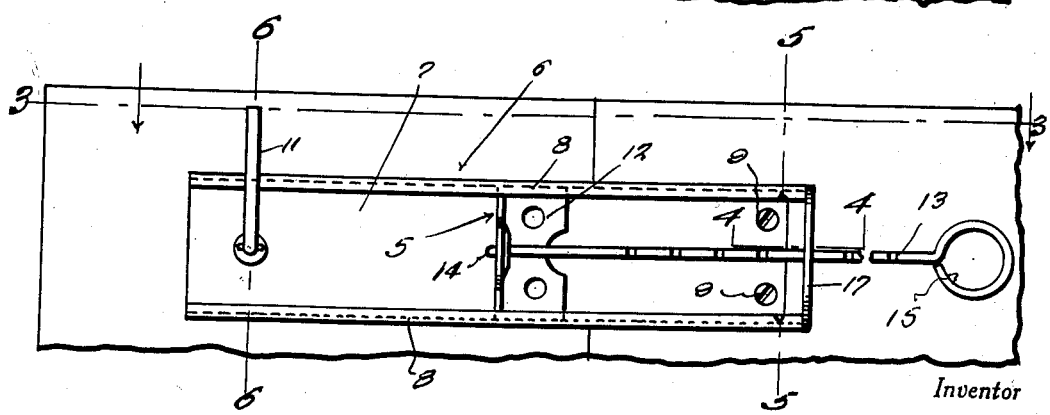
Figure 2 is an elevational view of the bracket and mounting therefor.

Figures 3, 4, 5 and 6 are detail views taken substantially on the lines 3—3, 4—4, 5—5 and 6—6, respectively, of Figure 2.

Figure 1:
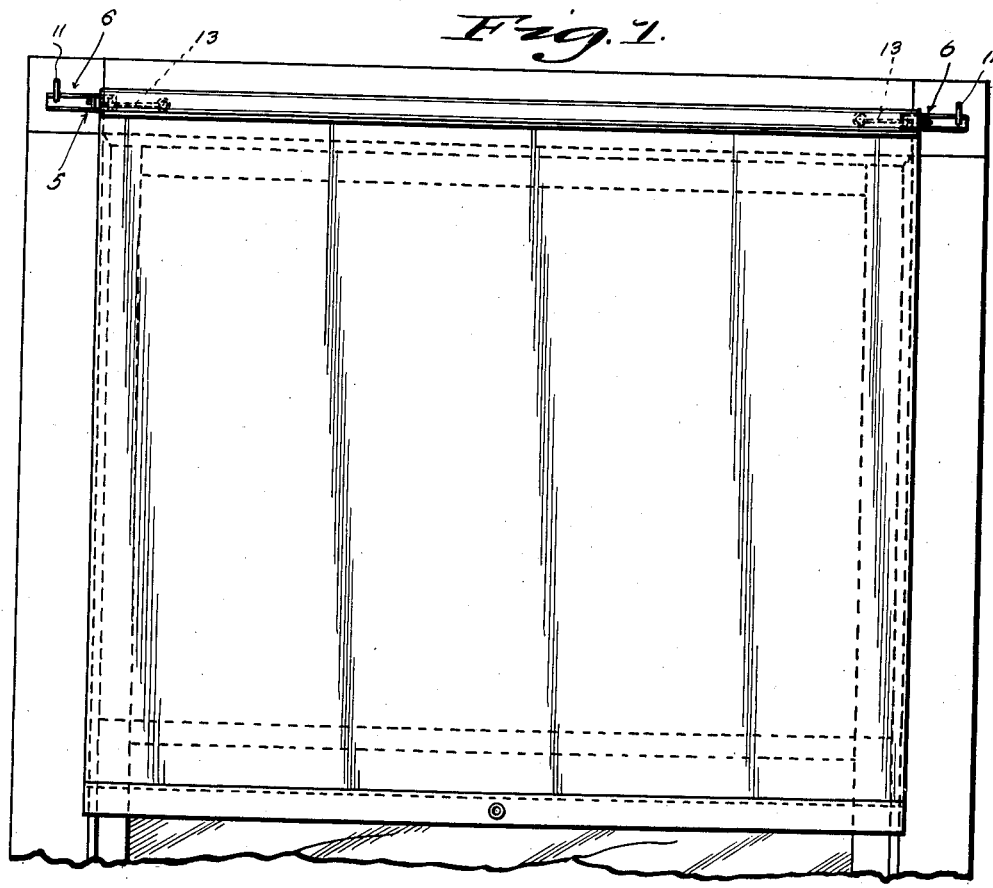
Figure 1 is an elevational view illustrating the application of the invention.

Referring more in detail to the drawings it will be seen that in the preferred embodiment thereof for each shade roller bracket 5, a pair of such brackets being shown in Figure 1, there is provided a mounting 6.

The mounting 6 comprises an attaching plate 7 that is oblong and is provided at its upper and lower edges with inturned flanges providing guide channels 8.

At one end thereof the attaching plate 7 is apertured to accommodate screws or other fastening elements 9, while at an opposite end thereof the plate 7 is apertured to receive the threaded shanks 10 of a drape or curtain rod bracket 11.

In the present instance the bracket 11 is substantially L-shaped presenting a perpendicular arm for the attachment, in an obvious manner, of one end of a curtain rod thereto and a horizontal arm merging into the tapered threaded shank 10 that serves both to secure the bracket 11 in position with respect to the mounting 7 and also, in cooperation with the fastening elements 9, to further secure the mounting plate 7 on the window frame.

The shade roller bracket 5 is of conventional construction and the base flange 12 thereof is arranged in sliding contact with the attaching plate 7 with the upper and lower edges of the flange 12 engaging in the guide channels 8 as shown.

Also for the bracket 5 there is provided a push and pull rod 13 that has one end suitably engaged as at 14, in a fixed, positive manner with the arm of the bracket 5 as shown. The free end of the rod 13 is provided with an integral eye or ring 15 to provide a handle for the rod.

The rod 13 works through a slot 16 provided therefor in an end flange 17 provided on the plate 7 at one end of the latter. The slot 16 is in the form of a keyhole slot and the rod 17 is provided with a longitudinal series of notches 18 adapted to be selectively engaged in the smaller end of the slot 16 for securing the bracket 5 at the desired position of adjustment.

For releasably maintaining the rod 13 in engagement with the slotted portion of the flange 17 there is provided on the mounting plate 7 adjacent the flange 17 a longitudinally bowed spring 19 the ends of which are suitably anchored within the guide channels 8.

As shown in Figure 5 the spring 19 bears against the inner side of the rod 13 urging the latter outwardly from the plate 7 and into positive engagement with the flange 17.

Obviously to shift the bracket 5 to the desired position of adjustment on the mounting plate 7 the operator pushes inwardly on the rod 13 against the action of spring 19 to first release the rod 13. With the rod thus released a push or pull is exerted on the rod 13 to slide the bracket 5 in the proper direction. When the bracket 5 is at the desired position of adjustment pressure on the rod 13 against the action of spring 19 is released so that spring 19 then acts on the rod to urge the same forwardly so that a notch 18 of the rod will engage in the smaller end of the slot 16 and the bracket 5 thus releasably secured at the desired position of adjustment.

Thus it will be seen that the bracket 5 may be conveniently adjusted as the length of a shade roller may require.

It is thought that a clear understanding of the construction, utility, operation and advantages of a shade bracket of this character will be had without a more detailed description.

Having thus described the invention what is claimed as new is:

1. In a device of the character described, an attachment plate provided with a pair of opposed parallel channels, a shade roller bracket having a base flange in sliding contact with said plate and opposite end edge portions of the base flange engaging in said channels, and a push and pull rod for said bracket secured at one end thereof with the bracket to facilitate sliding the bracket to a desired position of adjustment on the mounting plate, said mounting plate at one end thereof provided with a flange having a slot therein accommodating said rod, and said rod being provided with a longitudinal series of notches adapted to be selectively engaged with the slot in the last-named flange for releasably securing the bracket at the desired position of adjustment.

2. In a device of the character described, an attachment plate provided with a pair of opposed parallel channels, a shade roller bracket having a base flange in sliding contact with said plate and opposite end edge portions of the base flange engaging in said channels, and a push and pull rod for said bracket secured at one end thereof with the bracket to facilitate sliding the bracket to a desired position of adjustment on the mounting plate, said mounting plate at one end thereof provided with a flange having a slot therein accommodating said rod, and said rod being provided with a longitudinal series of notches adapted to be selectively engaged with the slot in the last-named flange for releasably securing the bracket at the desired position of adjustment, and a spring member mounted on the mounting plate and resiliently bearing against said rod for releasably maintaining a notched portion of the rod in engagement with the slotted portion of said flange.

JOSEPH A. JUMONVILLE.